(No Model.)
J. F. WARNICK.
ANIMAL TRAP.
No. 415,486. Patented Nov. 19, 1889.
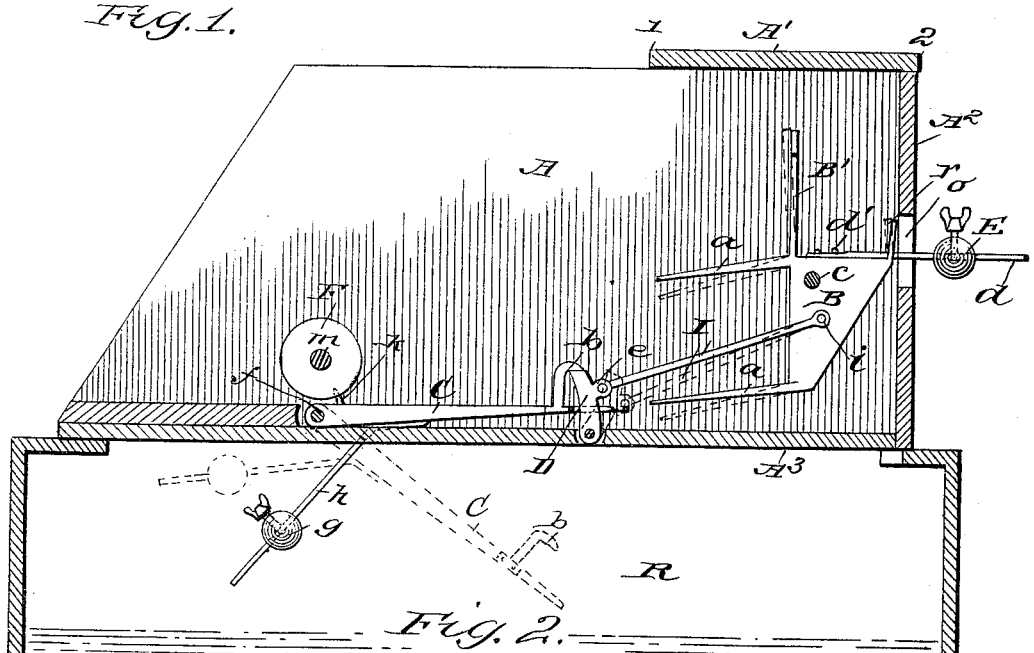
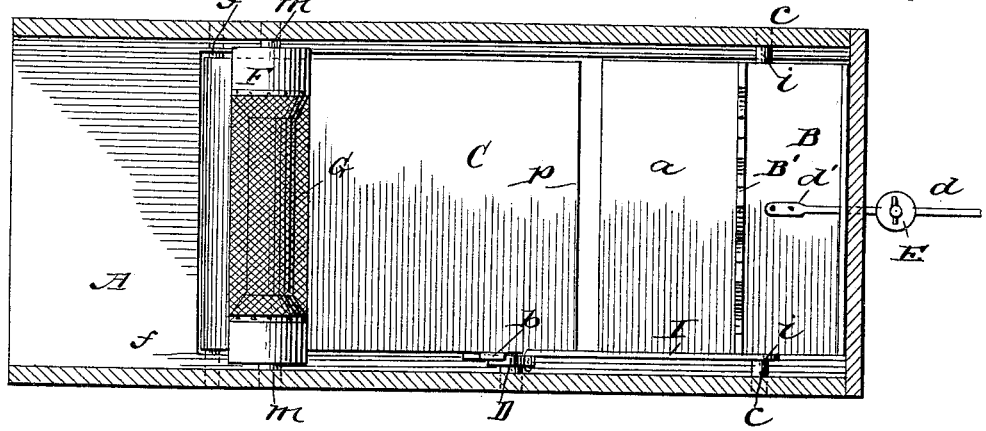
WITNESSES:
W. R. Davis
C. Sedgwick
INVENTOR:
J. F. Warnick
BY
Munn & Co.
ATTORNEYS.

UNITED STATES PATENT OFFICE.

JAMES F. WARNICK, OF EUGENE, OREGON.

ANIMAL-TRAP.

SPECIFICATION forming part of Letters Patent No. 415,486, dated November 19, 1889.

Application filed July 29, 1889. Serial No. 319,030. (No model.)

*To all whom it may concern:*

Be it known that I, JAMES F. WARNICK, of Eugene, in the county of Lane and State of Oregon, have invented a new and useful Improvement in Animal-Traps, of which the following is a full, clear, and exact description.

My invention relates to an improvement in animal-traps, and has for its objects the production of a simple, reliable, self-setting device, by which animals of the rodent species may be captured alive, or be thrown into a water-tank and drowned.

With these objects in view my invention consists in the peculiar construction of parts and their combination, as is hereinafter described, and pointed out in the claims.

Reference is to be had to the accompanying drawings, forming a part of this specification, in which similar letters of reference indicate corresponding parts in both the figures.

Figure 1 is a side elevation of the trap, having one side of its frame removed to expose interior parts, a portion of a receptacle in which trapped animals are retained being also shown; Fig. 2 is a top plan view of the device with the top wall of the frame removed.

It is one of the features of the trap which is the subject of my present invention that animals are not killed by its mechanism directly, but that it will precipitate them into a secure receptacle R, upon which the trap is placed, which receptacle may be partially filled with water to drown vermin, such as rats or mice, while if squirrels are trapped by the device these may be retained alive, if desired.

A represents the frame of the trap. It is preferably made as a box, rectangular in form, having one end wall removed, as well as a portion of the top wall A', which covers the closed sides of the frame between the points 1 and 2. The bottom wall $A^3$ of the frame A is cut away to produce a rectangular orifice therein, which is as wide as the trap-frame. The hole in the bottom of the frame is normally closed by the trap-board C, which is pivoted to the side walls of the frame at $f$, its weight being counterbalanced by the adjustable weight $g$.

A bait-box B is provided, which is pivoted at $c$ to the side walls of the frame, so as to permit it to rock and vibrate the projecting platforms $a\ a$, that extend from front edge of the box, as shown in Fig. 1, a vertical serrated wall B' also projecting from said front edge of the box B. The bait-box is furnished with a counterbalance-weight E, which is mounted upon and adjustably secured to the horizontally-extended arm $d$, that is fastened by its inner end $d'$ to the upper surface of the bait-box B, the body of the arm projecting through a vertical elongated slot $o$, formed in the rear wall $A^2$ of the frame.

Upon the trap-board C, near its free edge $p$, a hook $b$ is secured, the latching-jaw of which is projected toward the bait-box B. In proper position to engage the jaw of this hook with its upper end a rocking dog D is pivoted to the frame on its bottom, or side wall near the bottom, as shown in Fig. 1, so as to retain the trap-board C stably when such an engagement of parts is effected. A connecting-rod I is pivoted by one end to the side of the bait-box B, and has its opposite end loosely jointed to the projecting ear $e$ of the dog D, the length of the connecting-rod and its points of connection between the dog D and bait-box being such that the latter will be retained with its platforms $a\ a$ rocked upwardly, as shown in full lines in Fig. 1, when the dog is engaged by the jaw of the hook $b$.

At a point nearly in vertical line with the pivots $f$ of the trap-board C a transverse roller F is journaled, as at $m$. These journal ends engaging perforations in the side walls of the frame permit revoluble movement of the roller. A portion of the body of the roller F is cut away, as shown in Fig. 2, and a screen wire-cloth cover G is secured upon the end portions of the roller-body, so as to cover the reduced part which forms an annular channel around the roller. One or more small projecting pins $k$ extend from the adjacent surface of the trap-board C, and when said board is in a horizontal position the pointed ends of the pin or pins enter the interstices of the wire-cloth and lock the roller F from rotating.

To prepare the trap for use, it is located upon a close receptacle R, previously mentioned, so that the trap-board C may be free to swing downwardly. Bait of any proper kind is placed upon the box B, between the serrated front wall B' and the rear wall r, which latter covers the slot o and prevents access to the bait at that point. The trap-board C is held in place by engagement of the hook b with the dog D, as previously explained. The animal enters the open space at the front of the trap-frame, and in its effort to secure the bait rests its front paws on the platforms a, while its head is partly above the serrated top edge of the vertical wall B'. As the counterpoise of the bait-box renders it sensitive to any additional weight imposed upon its front portion, the intrusion of the animal, as stated, will rock the platforms a downwardly. The pivotal point of connection of the rod I with the box B, as will be noticed, is below and to the rear of the journals c of the box, so that a downward movement of the platforms a will draw the connecting-rod rearwardly, and with it the dog D, thus releasing the trap-board C, upon which the major portion of the animal's body rests. When the trap-board swings down, as shown in dotted lines in Fig. 1, the small pin k will be withdrawn from the wire-cloth covering of the roller F, so that the latter piece is free to rotate, and this by its revolution aids the precipitation of the animal into the receptacle R. After a rat or other rodent has been trapped the trap-board C will swing up and engage again the top portion of the dog D, that has been rocked forward in an obvious manner, when the bait-box B is free from contact with the animal that has just passed down off of the trap-board into the lower chamber or receptacle, so that the device is self-setting in its operation, and a number of rats, mice, or squirrels may be captured automatically by its employment.

Having fully described my invention, what I claim as new, and desire to secure by Letters Patent, is—

1. In an animal-trap, the combination, with a frame open at its front end, a trap-board pivoted at its front end, a screen-covered cylindrical roller, which is adapted to engage a pin in the trap-board when the board is horizontally held, and a pivoted bait-box located in the rear of the trap, of a rocking dog pivoted at one side of the trap-frame, a hook attached to the trap-board, which is adapted to engage the rocking dog, and a connecting-rod which is pivoted by its ends to the dog and bait-box, substantially as set forth.

2. In an animal-trap, the combination, with a frame open at its front end, a pivoted trap-board having a hook near its free end, and an adjustable counterbalance-weight for the trap-board, of a journaled bait-box counterbalanced by a weight, a vertical wall formed on the bait-box, a horizontal platform projected from the bait-box, a rocking dog which engages the hook on the trap-board, and a connecting-rod that is loosely secured by its ends to the rocking dog and bait-box, substantially as set forth.

3. In an animal-trap, the combination, with a frame open at one end, a counterbalanced trap-board pivoted near one of its ends in a hole in the bottom of the frame, and a hook affixed to the trap-board near its free end, of a transverse roller that is adapted to be locked from rotation when the trap-board is set horizontally, a journaled bait-box which is counterbalanced, a rocking dog pivoted to the frame and engaging the hook of the trap-board, and a connecting-rod which is pivoted to the rocking dog and bait-box, substantially as set forth.

4. In an animal-trap, the combination, with a frame having side and rear walls and open at its front end, a trap-board pivoted at its front end in a hole in the trap-frame bottom, a screen-covered roller which interlocks with a pin when the trap-board is set, and a hook secured at a side edge of the trap-board, near its free end, of a tilting pivoted bait-box, a weight adjustably mounted on a rod that projects through the rear wall of the frame and is connected by one end to the bait-box to counterbalance it, a wall affixed to the front of the bait-box, a lower projecting platform also affixed to the bait-box, so as to vibrate with it, a rocking dog pivoted to the trap-frame and made to engage the hook on the trap-board, and a rod which is pivoted to the dog and bait-box, substantially as set forth

JAMES F. WARNICK.

Witnesses:
F. J. CROUCH,
J. H. WEIDER.